May 21, 1940.  F. V. WALTZ  2,201,600
TRANSMISSION DEVICE
Filed July 20, 1939
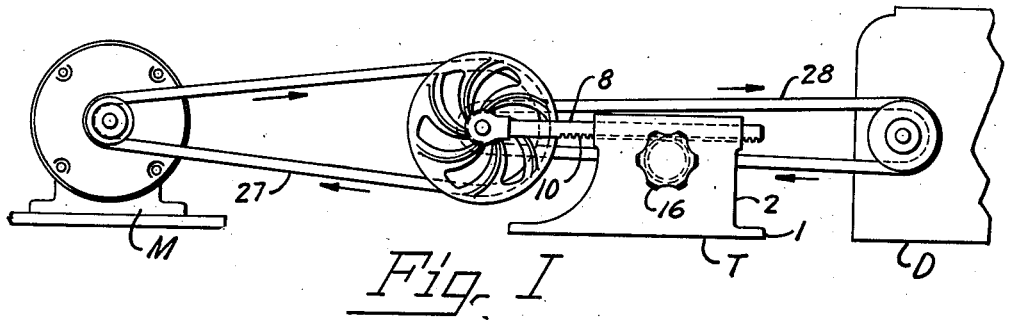
Fig. I
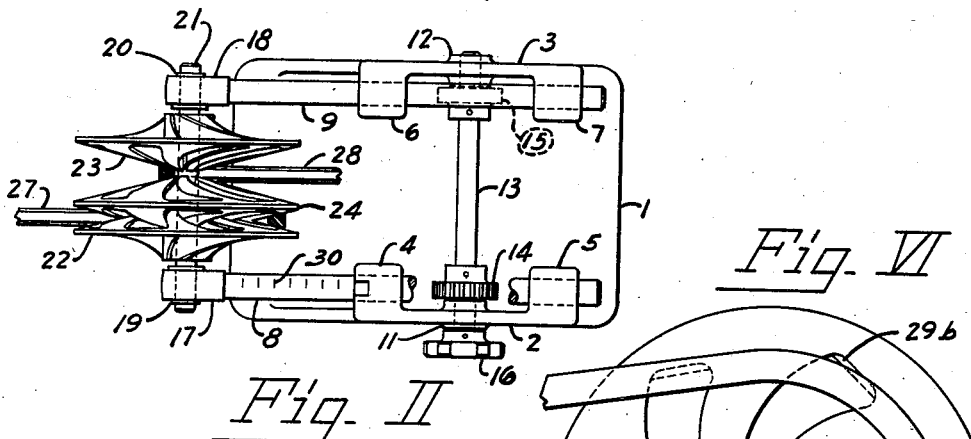
Fig. II
Fig. VI
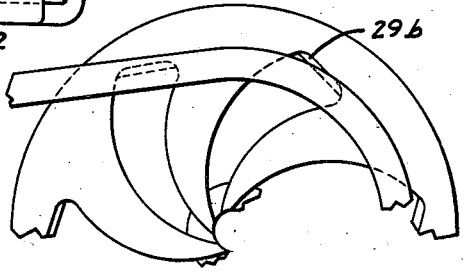
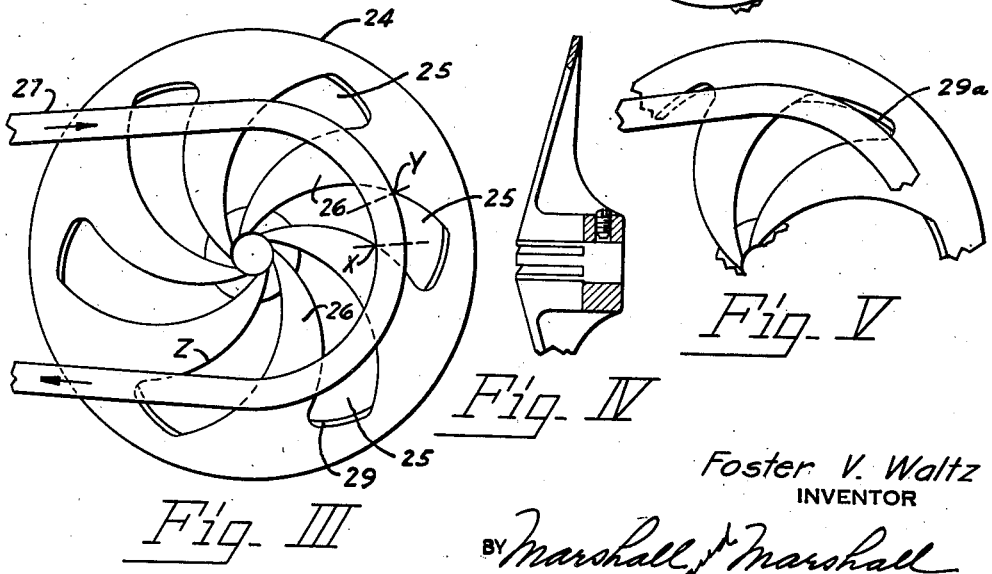
Fig. III  Fig. IV  Fig. V
Foster V. Waltz
INVENTOR
BY Marshall & Marshall
ATTORNEYS Patented May 21, 1940

2,201,600

UNITED STATES PATENT OFFICE 2,201,600

TRANSMISSION DEVICE

Foster V. Waltz, Toledo, Ohio

Application July 20, 1939, Serial No. 285,508

8 Claims. (Cl. 74—230.17)

This invention relates to transmission devices, and particularly to variable speed transmission devices having composite pulleys each consisting of a plurality of conical faced members with openings cut into their conical faces to form spoke-like sectors which are interdigitated or meshed when the pulley members are assembled. In transmission devices of this type the pulley members are movable toward and away from each other, so that the effective diameters of annular V-shaped channels formed by their intersecting conical faces become larger or smaller, and the speed of belts passing around the pulleys becomes greater or less.

Because of the fact that the conical faces of the pulley members have openings alternating with solid sectors, the belts passing around them are supported at alternate places on opposite sides and the alternate sections of the belts tend to be pressed into the openings in the opposed pulley faces, so that the bights of the belts that are looped around the pulley members tend to be crimped into wavy form.

Such crowding of alternate sections of belt into the openings in the pulley faces absorbs power which is worse than wasted because it increases the wear and tear on the belt, sets up vibration and interference with the smooth and quiet running of the transmission mechanism, and the ease with which it may be adjusted for changes of speed. As a belt leaves a pulley as heretofore constructed it must be pulled out of the openings into which it has been pressed, which again absorbs power, sets up vibration, and causes noise and wear.

The evils resulting from the pressure of the belt into openings in the cone faces of the pulley members are added to when the belt takes around the cone faces just below their rims, because portions of the outer side of the belt, having been pressed under the segments of the rims which bound the openings at their outer ends, must be jerked from beneath the segments of the rims as the belt rides off the pulley. The additional interference with smooth running that is caused by catching of portions of the belt under the rim segments frequently sets up chattering that makes the operation of the device very noisy and inefficient when the required speed is such that the belt must take around the cone faces just within the rims.

It is an object of this invention to provide a transmission device having pulleys consisting of members with conical faces having cutout portions and meshing sectors adapted to engage a belt with a minimum of crimping distortion.

Another object of the invention is to provide a transmission device of this type in which the belt is engaged and disengaged by the conical faces of the pulley members with a minimum of power loss and a minimum of vibratory effect.

Another object is to provide a transmission device of this type in which wear and tear on the belt is minimized.

Another object is to provide a pulley consisting of conical faced members with meshing sectors and openings so shaped as to provide improved support for the sides of the belt.

Another object is to provide a pulley of this type in which the meshing sectors and openings are so shaped as to clutch the belt firmly as it runs upon the pulley and to release the belt easily as it runs off of the pulley.

Other objects and advantages will be apparent from the following description, in which reference is had to the accompanying drawing illustrating preferred embodiments of my invention and wherein similar reference numerals designate similar parts throughout the several views.

In the drawing:

Fig. I is a side elevational view of a variable speed transmission device incorporating my invention, the variable speed transmission mechanism being shown as connected to a motor and to a machine to be operated.

Fig. II is a plan view, on a slightly enlarged scale, of the transmission mechanism per se.

Fig. III is an enlarged side elevational view of one form of a cone faced pulley member of my invention, a portion of the belt being shown as engaged thereby.

Fig. IV is a fragmentary sectional view showing one of the outside pulley members illustrated in Fig. II enlarged to the same extent as the pulley member illustrated in Fig. III.

Fig. V is a fragmentary side elevational view, on the same scale as that of Fig. III, showing a modified form of the pulley member of my invention engaging a portion of a belt; and Fig. VI is a view similar to Fig. V but showing another modification of my invention.

The variable speed mechanism T is illustrated in Fig. I as connected to a motor M and a driven machine D, and is illustrated in plan view in Fig. II. It has a base 1, from the sides of which arise a pair of walls 2 and 3. Projecting inwardly from the upper edges of the wall 2 is a pair of bosses 4 and 5, while a similar pair of bosses 6 and 7 projects inwardly from the wall 3.

The bosses 4 and 5 are provided with horizontal bores forming ways in which a bar 8 is slidably mounted, while a similar bar 9 is slidably mounted in ways formed by the bores in the bosses 6 and 7. The lower sides of the bar 8 has rack teeth 10 formed thereon, and similar rack teeth (not shown) are formed upon the lower side of the bar 9.

Rotatably mounted in journals 11 and 12 in the walls 2 and 3 is a shaft 13 upon which are fixed pinions 14 and 15, the teeth of which mesh respectively with the rack teeth upon the lower sides of the bars 8 and 9. The shaft 13 may be rotated by means of a knob 16 which is fixed to the forward end of the shaft 13 that extends outside the wall 2, and when the shaft is thus rotated the bars 8 and 9 slide endwise through their ways in the same direction and to the same extent.

Removably secured upon the ends of the bars 8 and 9 are a pair of fittings 17 and 18 carrying anti-friction bearings 19 and 20 in which a jackshaft 21 is mounted for both rotary and endwise movement. Fixed to the jackshaft 21, adjacent its ends, are single conical faced pulley members 22 and 23, while a double conical faced pulley member 24 is slidably mounted on the jackshaft between the single faced pulley members 22 and 23. The conical faces of the pulley members 22, 23 and 24 have openings 25 formed therein which alternate with spoke-like sectors 26. The openings and the spoke-like sectors are of substantially the same shape, the openings being just enough larger than the sectors to permit the sectors of the double cone faced member to move freely into and out of the openings in the single cone faced members, and to permit the sectors of the single cone faced members to be freely received in the openings of the double cone faced member as it slides along the jackshaft.

Lying in the annular channel formed by the intermeshing conical faces of the side pulley member 22 and the intermediate pulley member 24 is a bevel sided belt 27 which is driven by the motor M in the direction indicated by the arrows in Figs. I and III, and lying between the opposed faces of the side pulley member 23 and the intermediate pulley member 24 is a similar belt 28 which is driven by the jackshaft in the direction indicated by the arrows in Fig. I.

Heretofore pulleys of this general type have been made with openings having straight, substantially radial sides. Such openings left the sides of the segments of belt which lay across them entirely unsupported on the side toward the openings. The device of my invention differs fom such devices as heretofore constructed in that the openings in the faces of the pulley members are non-radial and are curved preferably as shown in Fig. III. Hence, the side of the belt which overlies an opening is supported adjacent its inner edge and adjacent its outer edge at places which are angularly spaced apart less than the width of the opening. Thus the belt 27, as illustrated in Fig. III, is supported at the points X and Y, the angular spacing of which, as indicated by the dotted lines passing through the points, is much less than the width of the opening. The belt thus supported is not pressed into the opening to the extent that it would be if the sides of the opening were radial.

Moreover, as the lower reach of the belt leaves the pulley, at the point marked Z on Fig. III, the curved forward side of the opening against which the belt is pulled lifts away from it much more freely than it would if the side were radial. Since the belt 28 is released from the top of the pulley, the pulley member 23 has openings which are curved forwardly at the top, i. e. the pulley member 23 is a mere replica of the pulley member 22. The meshing faces of the pulley members 22 and 24 are mere replicas, and the meshing faces of the pulley members 23 and 24 of course are mere replicas also.

In pulleys of this general type as made heretofore, not only were the diverging sides of the openings substantially radial, but the outer ends of the openings were curved about the pulley axis, or normal to the pulley radii. Hence, when the mechanisms as heretofore constructed were so adjusted that the belts lay along the inner edges of the pulley member rims, the outer edges of the belts would be forced beneath the inner edges of the rims, and additional force would be required to jerk them out again. I have discovered that this fault is remedied by making the outer ends of the openings non-concentric with respect to the pulley axis and non-normal to the pulley radii. The ends of the openings are preferably curved as indicated at 29 in Fig. III or at 29a in Fig. V, or they may be straight, as indicated at 29b in Fig. VI. They may slope inwardly and forwardly as in Fig. III, or outwardly and forwardly as in Fig. V. Preferably the outer ends of the openings are beveled or rounded to avoid the scraping action of sharp corners as the belt moves over them. It will be seen by inspection of Figs. V and VI that with the ends of the openings formed according to my invention, there is little or no liability of the belt being caught by the inner side of the rim, even when the belt lies closely adjacent thereto.

In the operation of the device adjusted as illustrated in Fig. I, the motor M turns the composite pulley at reduced speed, and the composite pulley turns the shaft of the driven machine D at further reduced speed. When it is desired to increase the speed of the driven machine the knob 16 is turned clockwise, thus moving the composite pulley toward the right, tightening the belt 27 and loosening the belt 28. Tightening the belt 27 forces the pulley members 22 and 24 apart and the pulley members 24 and 23 together as the loosened belt 28 moves outwardly in the annular V-shaped channel between them. Meanwhile the jackshaft 21 moves endwise sufficiently to permit the two belts to operate along parallel planes to the motor pulley and the driven machine pulley.

When the effective diameter of the annular channel between the pulley members 22 and 24 decreases and the effective diameter of the annular channel between the pulley members 24 and 23 increases, the speed of the driven machine accelerates. If the effective diameter of the annular channel between the pulley members 22 and 24 be halved and the effective diameter of the annular channel between the pulley members 24 and 23 be doubled, the speed of the driven machine will be quadrupled, since the speed of the driven machine varies inversely as the ratio between the effective diameter of the annular channel between the pulley members 22 and 24 and the effective diameter of the annular channel between the pulley members 24 and 23. If desired, the top of the bar 8 may be marked, as at 30, with indicia to show the various speeds at which the mechanism can be adjusted.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in combination, a plurality of conical faced pulley members having intermeshing spoke-like sectors and openings between said sectors, the sides of said openings being curved, the outer ends of said openings being curved about arcs eccentric with respect to the turning axis of said pulley members.

2. In a device of the class described, in combination, a composite pulley comprising a plurality of pulley members having conical faces provided with spoke-like sectors and openings between said sectors, the sectors of each of said pulley members meshing with the sectors of another of said pulley members, the sides of said openings being non-radial.

3. In a device of the class described, in combination, a composite pulley comprising a plurality of pulley members having conical faces provided with spoke-like sectors and openings between said sectors, the sectors of each of said pulley members meshing with the sectors of another of said pulley members, the sides of said openings being non-radial, and the outer ends of said openings being non-normal to the pulley radii.

4. In a device of the class described, in combination, a composite pulley comprising a plurality of conical faced pulley members, the conical faces of said pulley members having spoke-like sectors with openings therebetween, the sectors of each of said pulley members meshing with the sectors of another of said pulley members, the sides of the openings between said sectors being curved outwardly and forwardly with respect to the direction of rotation of said pulley members, and the outer ends of the openings between said sectors being curved about axes eccentric with respect to the axis of rotation of said pulley members.

5. In a device of the class described, in combination, a composite pulley comprising a plurality of conical faced pulley members, the conical faces of said pulley members having spoke-like sectors with openings therebetween, the sectors of each of said pulley members meshing with the sectors of another of said pulley members, the sides of the openings between said sectors being curved outwardly and forwardly with respect to the direction of rotation of said pulley members, and the outer ends of the openings between said sectors being non-normal to the pulley radii.

6. In a device of the class described, in combination, a composite pulley comprising a plurality of conical faced pulley members, the conical faces of said pulley members having spoke-like sectors with openings therebetween, the sectors of each of said pulley members meshing with the sectors of another of said pulley members, the sides of the openings between said sectors being curved outwardly and forwardly with respect to the direction of rotation of said pulley members, and the outer ends of the openings between said sectors being curved inwardly and forwardly with respect to the direction of rotation of said pulley members.

7. A conical faced pulley member having openings in its conical face which divide its conical face into spoke-like sectors, said openings having curved sides and outer ends curved about axes eccentric with respect to the axis of said pulley member.

8. In a device of the class described, in combination, a frame, a pair of bars slidably mounted on said frame for endwise movement, a jackshaft rotatably supported by said bars, a composite pulley mounted on said jackshaft, said composite pulley comprising a plurality of conical faced pulley members, each of said pulley members having spoke-like sectors in its conical face which mesh with spoke-like sectors in the conical face of another of said pulley members, and means for moving said bars endwise in the same direction and to the same extent, said means consisting of rack teeth incorporated with said bars, pinions having teeth meshing with said rack teeth, and means for simultaneously rotating said pinions.

FOSTER V. WALTZ.